(12) United States Patent
Spishak et al.

(10) Patent No.: US 7,596,843 B2
(45) Date of Patent: Oct. 6, 2009

(54) ROTATING INTERNAL SUPPORT APPARATUS AND METHOD FOR LARGE HOLLOW STRUCTURES

(75) Inventors: Noel A. Spishak, Bellevue, WA (US); Paul E. Nelson, University Place, WA (US); Thomas J. Hagman, Seattle, WA (US); Jeffrey D. Schwindt, Sumner, WA (US); Matthew J. Masters, Puyallup, WA (US); Michael G. Sanders, Federal Way, WA (US); Alan R. Merkley, Greenbank, WA (US); Eric M. Reid, Bothell, WA (US); James C. Murphy, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 688 days.

(21) Appl. No.: 11/153,482

(22) Filed: Jun. 16, 2005

(65) Prior Publication Data

US 2006/0284047 A1 Dec. 21, 2006

(51) Int. Cl.
*B25B 27/14* (2006.01)

(52) U.S. Cl. ............... 29/281.4; 29/559; 29/897.2; 29/466; 29/428; 269/48.1; 269/48.2; 269/50; 269/51; 269/52; 269/28; 269/909; 52/653.1

(58) Field of Classification Search ............... 52/650.1, 52/650.2, 650.3, 651.01, 652.1, 653.1, 654.1, 52/659, 637, 633, 638; 269/48.1, 52; 414/431, 414/684; 248/544, 670; 279/2.12
See application file for complete search history.

(56) References Cited

U.S. PATENT DOCUMENTS

| | | | |
|---|---|---|---|
| 811,435 A | * | 1/1906 | Perdue ............... 52/651.02 |
| 5,008,967 A | * | 4/1991 | Barrios et al. .......... 52/638 |
| 5,285,947 A | * | 2/1994 | Depperman ........... 269/48.1 |
| 6,481,096 B2 | | 11/2002 | Lehmker et al. ......... 29/721 |

* cited by examiner

*Primary Examiner*—Richard E Chilcot, Jr.
*Assistant Examiner*—Matthew J Smith

(57) ABSTRACT

A rotating internal support for a large hollow structure can include a rigid central truss and two or more annular disks coupled to the truss by support arms. The annular disks can be axially spaced along the longitudinal centerline of the truss, and can be coupled to the support arms by guide rollers that allow the annular disks to rotate about a central axis. The internal support can also include support rods with contact pads that extend axially around the annular disks to contact and support the inner surface of the large hollow structure.

28 Claims, 6 Drawing Sheets

ROTATING INTERNAL SUPPORT APPARATUS AND METHOD FOR LARGE HOLLOW STRUCTURES

FIELD OF THE INVENTION

The present invention relates generally to manufacturing tooling. More particularly, the present invention relates to a rigid internal support capable of rotation for handling large hollow structures during manufacturing and inspection.

BACKGROUND OF THE INVENTION

Manufacturing tooling is used to hold and maneuver objects during manufacturing processes. A wide variety of manufacturing tooling exists for use in a variety of industries. Manufacturing tooling can be general, that is, applied to a class or type of object, or application specific.

During the manufacture of certain large hollow structures, for example, large aircraft fuselage sections, a variety of manufacturing tools are required to hold and maneuver the structures during manufacturing and inspection. Some manufacturing tools can externally support a large hollow structure. However, these manufacturing tools do not permit certain inspection and manufacturing processes to be conveniently performed. For example, during the assembly of large composite airplane fuselage, it may be desirable to perform nondestructive inspection around the entire external circumference of a continuous, unspliced, one-piece fuselage section. Some types of nondestructive inspection require that the surface of the fuselage be unobstructed during the inspection; thus, the inspection cannot be performed while a fuselage section is held by an external support. As another example, painting processes often require that a large structure exterior surface be free from obstructions.

Accordingly, it is desirable to provide a method and apparatus that internally supports a large hollow structure, such as a large airplane fuselage section, and is capable of rotating and transporting the large hollow structure.

SUMMARY OF THE INVENTION

The foregoing needs are met, to a great extent, by the present invention, wherein in one aspect an apparatus is provided that in some embodiments can internally support a large hollow structure, such as a large airplane fuselage section, and is capable of rotating and transporting the large hollow structure.

In accordance with one aspect of the present invention, an internal support for a hollow, generally cylindrical structure that has at least one open end can include a truss and a plurality of annular disks aligned along a central axis that is parallel to the longitudinal centerline of the truss. The annular disks can be attached to the truss by a plurality of support arms, which can be fixedly attached to the truss and coupled to the annular disks.

In accordance with another aspect of the present invention, an internal support for a hollow, generally cylindrical structure that has at least one open end can include retractable means for circumferentially supporting an internal surface of the structure at a multiplicity of contact points around a circumference of the structure and rotatable means for retaining the retractable means for supporting. The internal support also can include central means for rigidly supporting the rotatable means for retaining, and vertically adjustable means for attaching the rotatable means for retaining to the central means for rigidly supporting.

In accordance with yet another aspect of the present invention, a method for internally supporting a hollow, generally cylindrical structure that has at least one open end can include the steps of rotatably attaching a plurality of annular disks at a plurality of axial locations along a central axis that is parallel to a longitudinal centerline of a substantially rigid central truss, and adjusting a vertical distance from the central truss to at least one of the annular disks. The method can also include the steps of retaining a plurality of radial support rods at circumferential intervals around each of the annular disks, and extending the support rods to contact an inner surface of the structure at a multiplicity of contact points in order to support the structure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
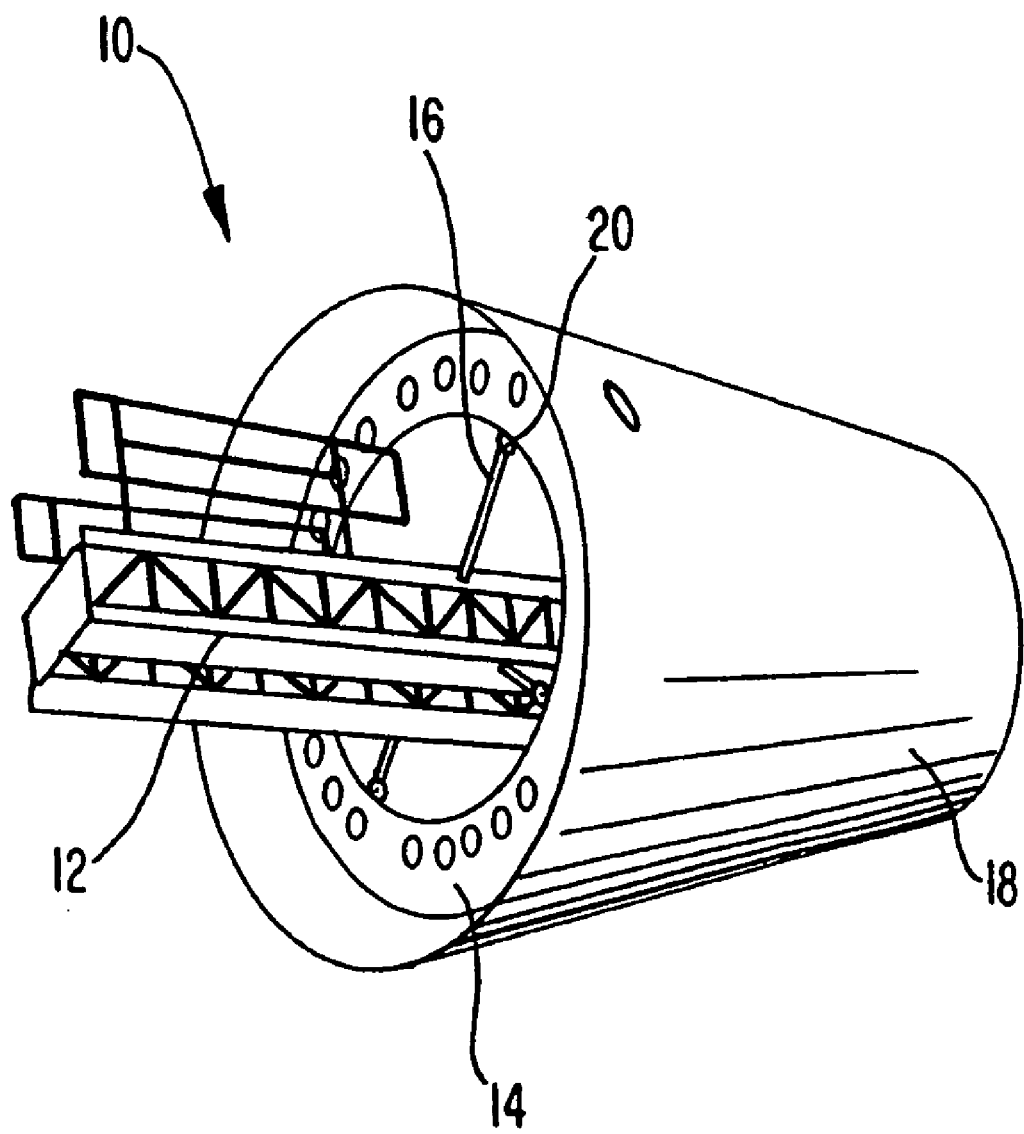
FIG. 1 is a perspective view illustrating a rotating internal support for large hollow structures holding a large airplane fuselage section.

An embodiment in accordance with the present invention provides an internal support for large hollow structures, such as large airplane fuselage sections, that is capable of rotating and transporting the large hollow structures. The internal support can include a rigid central truss and two or more rings, or annular disks, attached to the truss by support arms. The annular disks can be coupled to the support arms such that the annular disks can rotate about the central truss. This support configuration can provide a method for holding, rotating, and transporting, as well as providing for internal access and utilities, such as electrical connections and lighting, with a reconfigurable multi-use fixture that has the advantage that the exterior surface of the large hollow structure remains unobstructed, permitting a wide variety of manufacturing and inspection processes. The invention will now be described with reference to the drawing figures, in which like reference numerals refer to like parts throughout.

An embodiment of the present inventive apparatus and method is illustrated in FIG. 1. The internal support shown in FIG. 1 can include a central truss 12, two or more annular disks 14 (of which only one is visible in FIG. 1) encircling the central truss 12 and support arms 16 that couple the annular disks 14 to the central truss 12. The internal support 10 is shown in FIG. 1 holding a large airplane fuselage section 18. The annular disks 14 can be coupled to the support arms 16 using guide rollers 20 so that the annular disks 14 and the supported large hollow structure can be rotated about a central axis. The internal support 10 can also be used to transport the large hollow structure 18, for example, suspended from an overhead crane.

Figure 2:
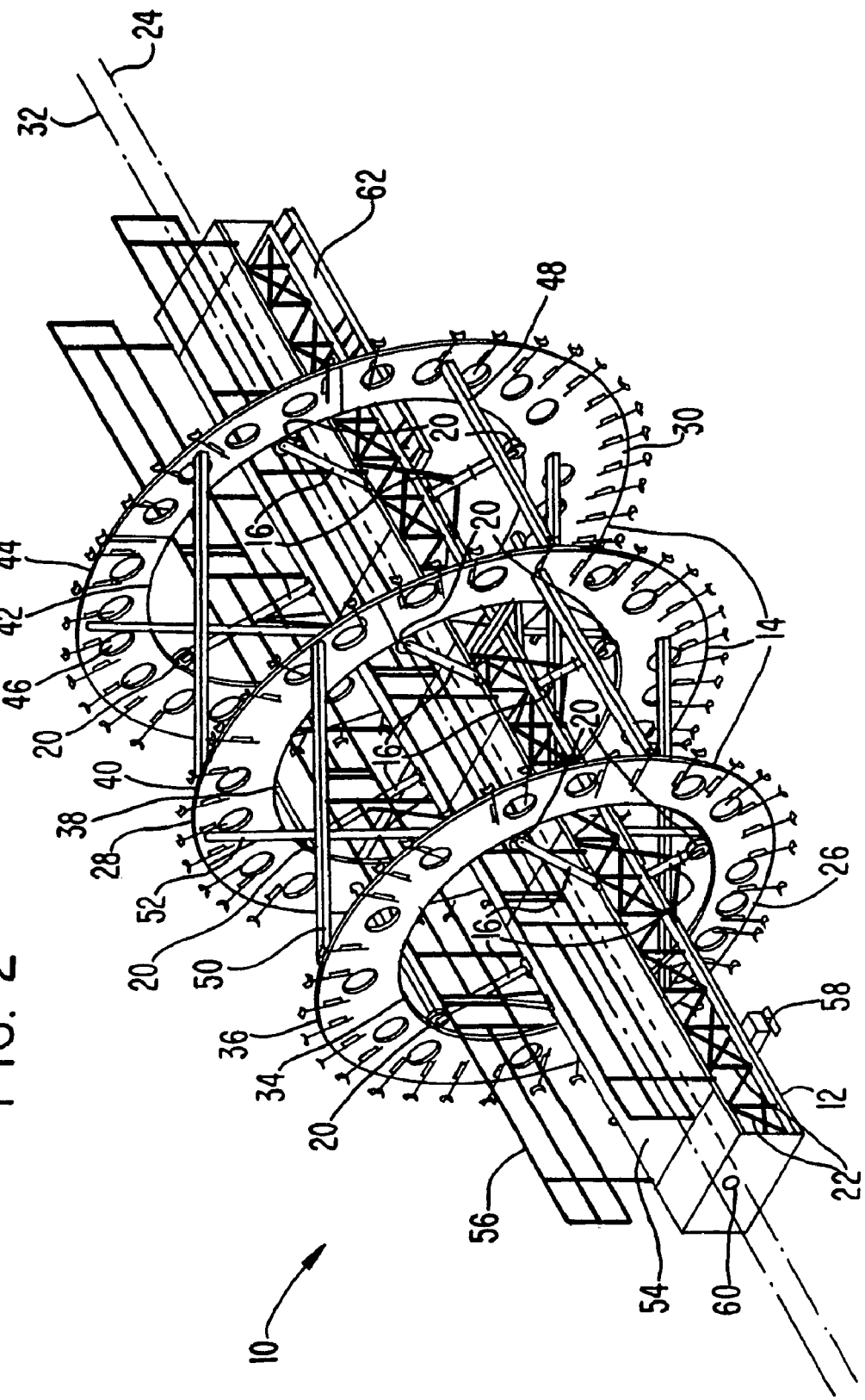
FIG. 2 is a perspective view of a rotating internal support for large hollow structures according to a preferred embodiment of the invention.

FIG. 2 illustrates an internal support 10 in accordance with a preferred embodiment of the invention. The internal support 10 can include a central truss 12 constructed from a number of straight, slender elements 22 configured in the shape of contiguous triangles to form a rigid structure that is resistant to bending along a longitudinal centerline 24, that is, resistant to bending about any axis that is orthogonal to the center line 24 of the truss 12. The truss configuration has the advantage that it is more rigid than some existing configurations, such as a spindle of generally round cross section. In particular, compared to some other configurations, a truss configuration can be relatively rigid, relatively light in weight, and relatively easy to fabricate.

The internal support 10 of FIG. 2 also can include three annular disks 14, including a first disk 26, a center disk 28 and a third disk 30. The annular disks 14 can be coupled to the central truss 12 by support arms 16. For example, in this embodiment each of the annular disks 14 is coupled to the central truss 12 by four support arms 16 connected to the truss 12 at each of the four corners of the rectangular cross section of the truss 12. Each of the support arms 16 can be coupled to one of the annular disks 14 by a guide roller 20 such that each of the annular disks 14 is able to rotate about its central axis 32. Alternative embodiments can include two annular disks or more than three annular disks, in accordance with the size of the large hollow structure to be supported.

In addition, the annular disks 14 are axially aligned along a central axis 32 that is parallel to the longitudinal centerline 24 of the truss 12. The inner circumference 34, 38, 42 of each of the annular disks 14 can be circular, so that the annular disks 14 are able to rotate about their central axis 32 on the guide rollers 20. The outer circumference 36, 40, 44 of each of the annular disks 14 can be circular, noncircular or nonsymmetric, so as to conform to the contour of the internal circumference of a particular large hollow structure. For example, the inner circumference 42 of the third annular disk 30 shown in FIG. 2 is circular, but the outer circumference 44 is noncircular and nonsymmetrical as evidenced by the greater radial thickness of the annular disk 30 at the bottom of the figure, as opposed to that at the top of the figure. This configuration can permit the internal support 10 to rotate about the central axis 32 of the annular disks 14 holding a large hollow structure with a cross-sectional circumference that is noncircular and non-symmetric, while the central truss 12 remains stationary, with the advantage that the large hollow structure is evenly supported around its circumference to prevent elliptical distortion of its cross section.

Furthermore, the annular disks 14 can include cutout areas 46 in order to reduce the overall weight of the annular disks 14. The cutout areas 46 can be circular, or can take any other form, such as rectangular, triangular or elliptical shapes.

Moreover, the annular disks 14 can be connected by structural reinforcement members, or stiffeners, such as the axial beams 48 and cross beams 50 and 52, or tie bars, shown in FIG. 2. These structural reinforcement elements can add rigidity to the internal support 10 and transfer torsion between the individual annular disks 14 in order to rotate the annular disks 14 in unison, maintaining constant relative clocking between the annular disks 14.

In some embodiments, the central truss 12 can be equipped with a walking platform 54 on the upper surface of the truss 12, or on more than one side of the truss 12. In addition, the truss 12 can be configured with a handrail 56 on one or both sides of the truss 12 as a safety measure for personnel on the walking platform 54.

In addition, the central truss 12 can be configured with support interfaces to allow the internal support 10 to be supported, suspended or transported. For example, the internal support 10 shown in FIG. 2 includes jack support interfaces 58 that permit the internal support 10 to stand on jacks or jack stands. In addition, the truss 12 can include suspension support interfaces 60 that permit the truss 12 to hang from hooks or other suspension interfaces. Thus, the internal support 10 can be transported, including when a large hollow structure is installed on the internal support 10, for example, using an overhead crane. Furthermore, the truss 12 can be configured with fork truck, or forklift, support interfaces 62 that permit a large forklift to support the truss 12 at one end, such that the truss is cantilevered from the forklift by way of the support interfaces 62. In this way, the internal support 10 can be used to transport a large hollow structure, in addition to statically holding a large hollow structure. For example, a fork truck can be used to insert the internal support 10 into a large fuselage section 18 (see FIG. 1) from one end of the fuselage section 18.

Figure 3:
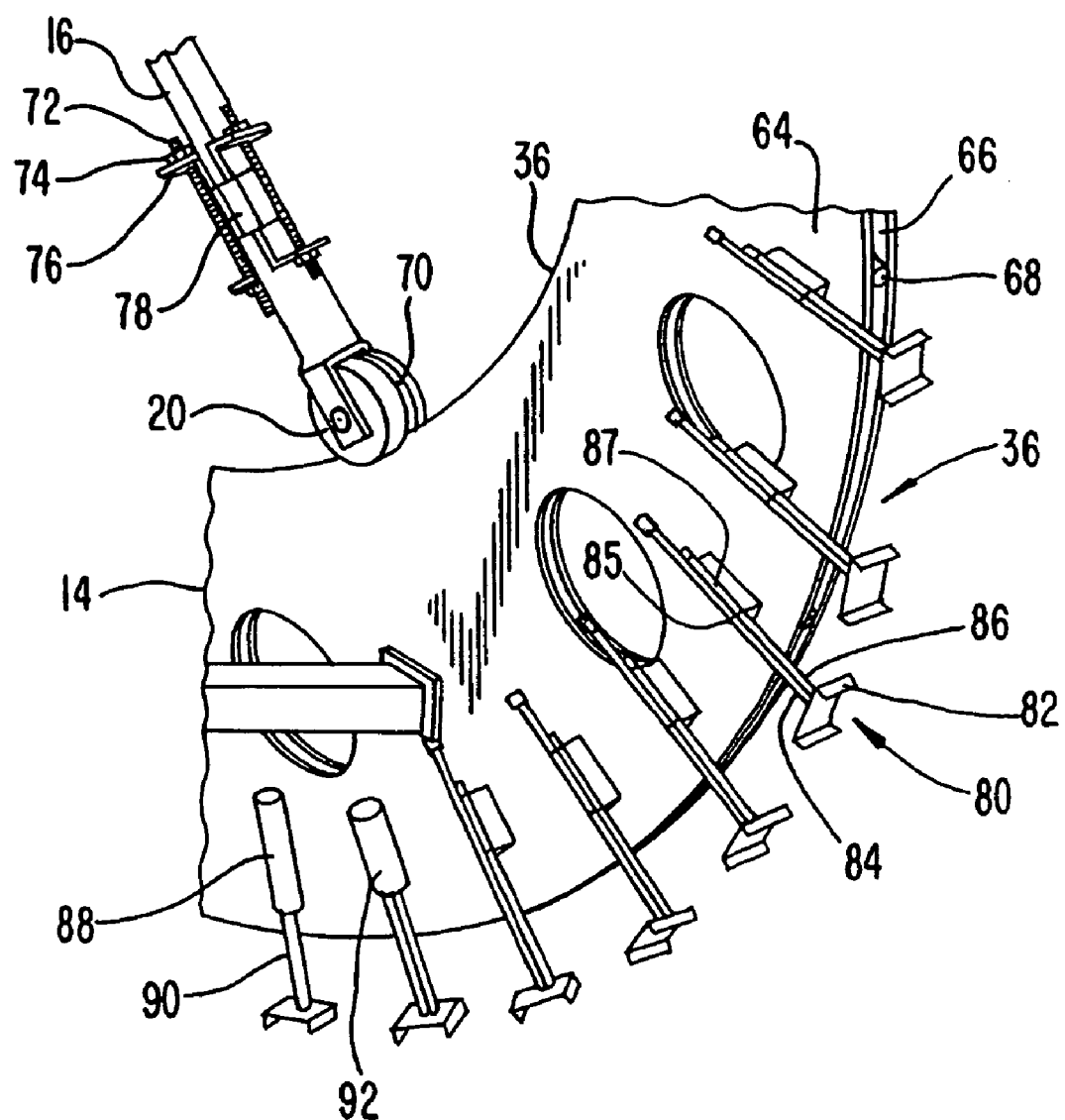
FIG. 3 is a detail view of an annular disk and a support arm that are compatible with the rotating internal support for large hollow structures of FIG. 2.

In various embodiments, the individual annular disks 14 can be constructed from two relatively thin annular disks, as shown in FIG. 3. For example, the annular disk 14 in FIG. 3 is constructed from a first thin annular disk 64 and a second thin annular disk 66 that are fastened together, or sandwiched, with spacers 68 placed between the two thin annular disks 64, 66. In a preferred embodiment, for example, the aggregate annular disks 14 are approximately 1½ inch thick, and include individual thin disks 64, 66 that are approximately ¼ inch thick. The spacers 68 maintain a constant separation between the two thin annular disks 64, 66 so that the overall width of the aggregate annular disk 14 conforms to a groove 70 in the guide roller 20 coupled to the inner circumference 36 of the annular disks 14. The guide roller 20 can include a groove 70 in order to retain the annular disks 14 in position.

As further shown in FIG. 3, the support arms 16 that couple the annular disks 14 to the central truss 12 (see FIG. 2) can be configured to retract and extend in order to permit installation of the annular disks 14. For example, as shown in FIG. 3, a support arm 16 can include adjustment screws 72 fastened by nuts 74 at two ends to attachment ears 76 on the support arm 16. The adjustment screws 72 can be tightened or loosened to retract or extend a telescoping segment 78 of the support arm 16. Thus, the support arms 16 on the internal support 10 (see FIG. 2) can be retracted so that the annular disks 14 can be installed or removed, and the support arm 16 can be extended to retain the annular disks 14 in position in the roller grooves 70. In various embodiments, support arms 16 of different lengths or differing extension ranges can accommodate annular disks 14 with differing inner diameters 34.

Each of the annular disks 14 can be configured with a number of support rods 80 attached to a face of the annular disks 14 at intervals, which may be evenly or unevenly spaced, around the circumference of the annular disks 14. For example, a preferred embodiment includes approximately thirty support rods 80 on each annular disk 14. The support rods 80 can be configured to radially extend beyond the outer circumference 36 of the annual disk 14 in order to contact and support the inner surface of a large hollow structure. The support rods 80 can include contact pads 82 attached by means of swivel joints at the distal end of the support rods 80 configured to contact and support the inner surface of a large hollow structure without damaging the surface or the structure. For example, in FIG. 3, each of the support rods 80 includes a long screw 84 attached to a threaded fastener 85 on the surface of the annular disk 14 and a guide shaft 86 aligned by a guide tube 87 attached to the face of the annular disk 14, which are linked to a contact pad 82. Thus, the screw 84 can be rotated in order to extend or retract the support rod 80.

The support rods 80 permit the internal support 10 to be inserted into a large hollow structure while the support rods 80 are retracted. Once the internal support 10 is positioned inside the large hollow structure, the support rods 80 can be extended until the contact pads 82 contact the inner surface of the large hollow structure in order to support the structure. In addition, the support rods 80 can be adjusted to accommodate small variations in diameter along the large hollow structure.

In an alternative embodiment, the support rods 80 can be actuated by a telescoping mechanism, such as the pneumatic cylinder 88 shown in FIG. 3. Supplying compressed air to the pneumatic cylinder 88 can cause the telescoping rod 90 to extend until the contact pads 82 contact the inner surface of the large hollow structure, and releasing compressed gas from the pneumatic cylinder 88 can cause the telescoping rod 90 to retract. In another alternative embodiment, the support rods 80 can be actuated by a servo motor 92. Other embodiments can include any suitable actuator configured to extend and retract the support rods 80.

Referring again to FIG. 2, in a preferred embodiment, the support arms 16 coupled to one or more of the annular disks 14 can be adjusted to accommodate for a vertical deflection of the central truss 12. For example, when the truss 12 is supported at both ends, by a suspension system or jacks, the distance between the truss 12 and the inner circumference 38 of the middle annular disk 28 can be adjusted to accommodate for downward deflection of the center of the truss 12 due to the weight of the internal support 10 and the large hollow structure. Similarly, when the central truss 12 is cantilevered from one end, such as when supported at the fork truck supports 62, the support arms 16 coupled to the first annular disk 26 and the second annular disk 28 can be adjusted to accommodate for the deflection of the truss 12 due to the weight of the internal support 10 and the large hollow structure.

Figure 4:
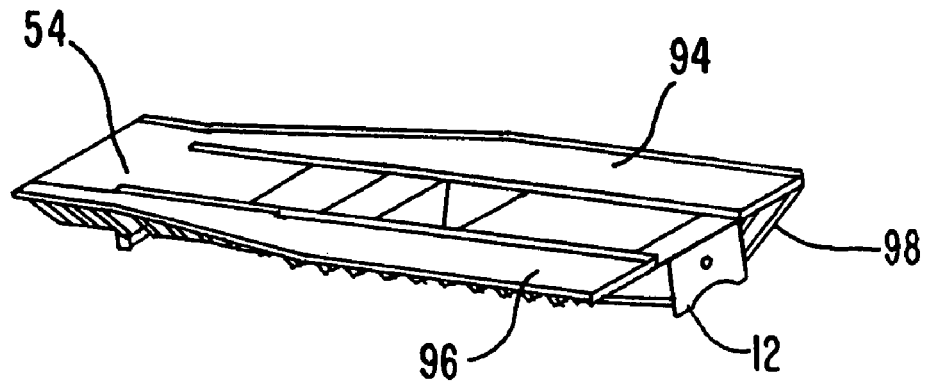
FIG. 4 is a perspective view illustrating a central truss with extended lateral platforms attached on each side that is compatible with the rotating internal support of FIG. 2.

In addition, in some embodiments the internal support 10 can be configured with extended lateral walking platforms such as the exemplary extended lateral platform 94 and the second extended lateral platform 96 shown in FIG. 4. The extended lateral platforms allow personnel to walk on a wider platform surface inside the large hollow structure, extending the effective reach of the truss platform 54. As shown in FIG. 4, the extended platforms can be connected to the truss 12 using struts 98 to support the extended lateral platforms 94, 96. The truss 12 with the extended lateral platforms 94, 96 allows personnel to perform manufacturing and inspection processes or set up automated manufacturing process tooling on the inner surface of the large hollow structure. Furthermore, the extended lateral platforms 94, 96 can be shaped to conform to the longitudinal contour of the inner surface of a large hollow structure. For example, the extended lateral platforms 94, 96 can be tapered along their outer edge, as shown in FIG. 4.

For example, the central truss 12 can be approximately 4 feet wide and include attachment points for extended lateral platforms 94, 96 and struts 98 that extend approximately 6 feet from the edge of the truss 12 to the sides of a large hollow structure. The extended lateral platforms 94, 96 can permit access to the inner surface of the large hollow structure for interior structure assembly, trim, inspection and installation of interior systems.

Figure 5:
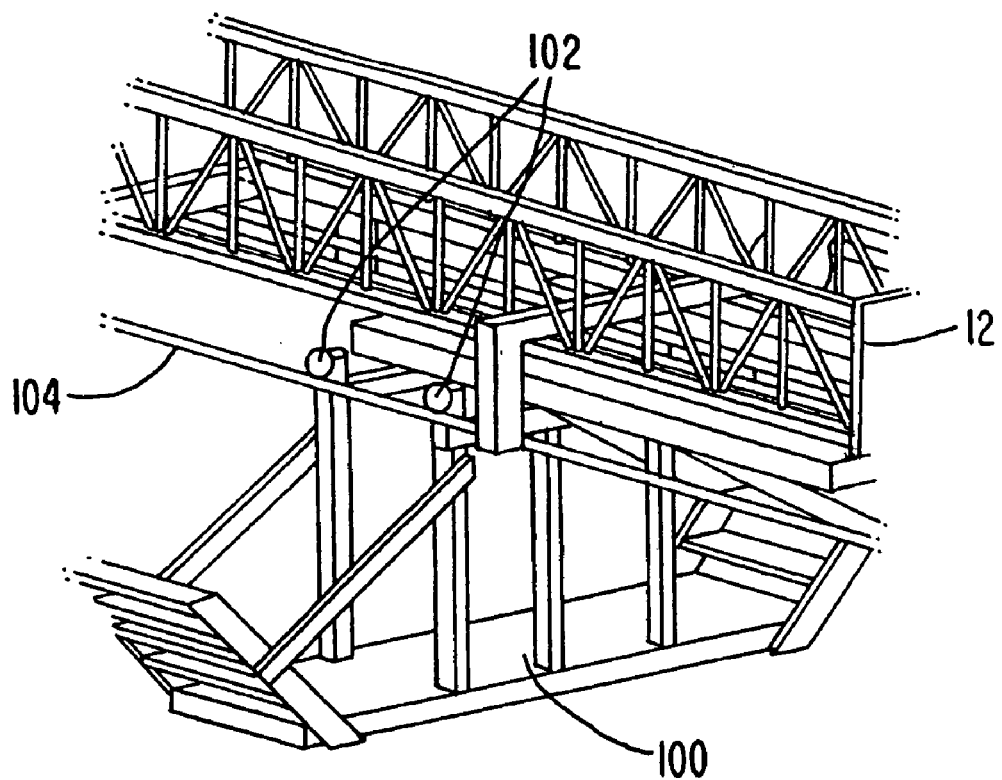
FIG. 5 is a perspective view illustrating a hanging cart coupled to the central truss of the rotating internal support of a large hollow structure of FIG. 2.

Furthermore, in some embodiments, the internal support 10 can be configured with a rail, or multiple rails, in order to mount a suspended cart below the central truss 12. For example, as shown in FIG. 5, a hanging cart 100 can be suspended from a set of rollers 102 that ride on a pair of rails 104 so that the cart 100 can move along the longitudinal centerline of the truss 12. The hanging cart 100 can permit personnel to reach the lower lobe a large hollow structure, such as a large airplane fuselage section 18 (see FIG. 1), allowing access to the lower half of the inner surface of the large hollow structure.

Moreover, the internal support 10 can be configured with a system for installing a floor grid in a large airplane fuselage section 18 (see FIG. 1). For example, the floor grid can be assembled outside of the large hollow structure and then can be inserted into the large hollow structure using a set of rollers or casters that roll on the platform 54 of the truss 12 or on a rail or rails.

The internal support 10 can be configured in a wide range of sizes, in accordance with the large hollow structure to be supported. For example, the internal support 10 can be configured to hold a generally cylindrical structure approximately 17 feet in diameter and approximately 37 feet in length, with one open end or two open ends. In addition, the structure may be non-self-supporting, such as a large airplane fuselage section 18 (see FIG. 1) before the installation of fuselage frames or a floor grid.

Figure 6:
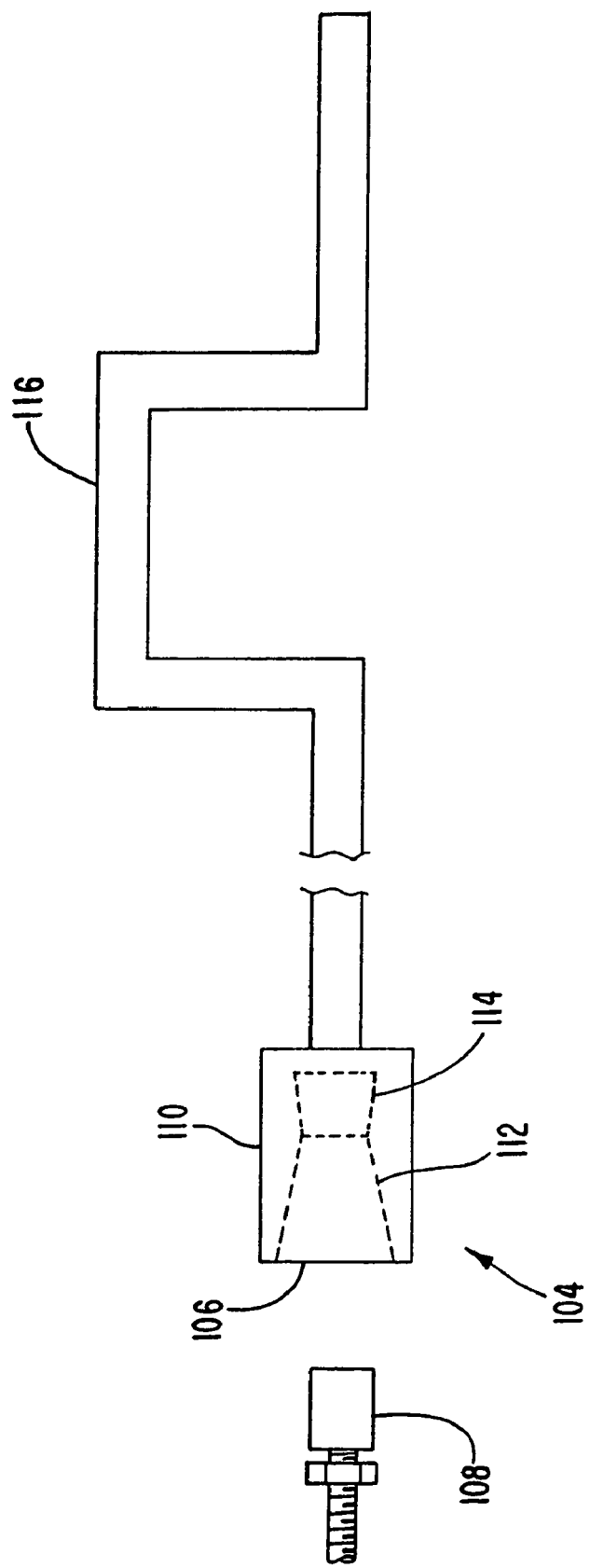
FIG. 6 is a plan view of a socket tool for actuation of support rod screws on the rotating internal support for large hollow structures of FIG. 2.

An embodiment of the internal support 10 can include a special socket tool for manual actuation of the support rod screws 84 (see FIG. 3). For example, as shown in FIG. 6 a socket tool 104 can include a generally square socket opening 106 that is larger than a screw head 108 of the screws 84. The socket opening 106 can permit the socket 110 to be placed over the screw head 108 from an off-center angle of approximately twenty degrees and includes internal guide surfaces 112 that guide the screw head 108 into a socket base 114 at the base of the socket 110. In addition, the sides of the socket base 114 can be angled to permit rotation of the screw head 108 from an off-center angle of approximately twenty degrees. Although the socket base 114 illustrated in FIG. 6 has a square cross-sectional shape, alternative embodiments of the socket tool 104 can include a socket base 114 including any suitable cross-sectional shape to engage a particular type of screw head 108, such as a hexagonal shape, a rectangular shape, or the like. The socket tool 104 also can include a handle 116 that is configured to allow an operator to rotate the socket 110 manually in a clockwise or counterclockwise direction in order to tighten or loosen the support rod screws 84. In some embodiments the handle 116 can be permanently attached to the socket 110, while in other embodiments the handle 116 can be detachable from the socket 110. Furthermore, in a preferred embodiment, the socket tool 104 with handle 116 can be approximately four to six feet long in order to allow an operator to reach the support rod screw heads 108 from the truss platform 54 (see FIG. 2).

Figure 7:
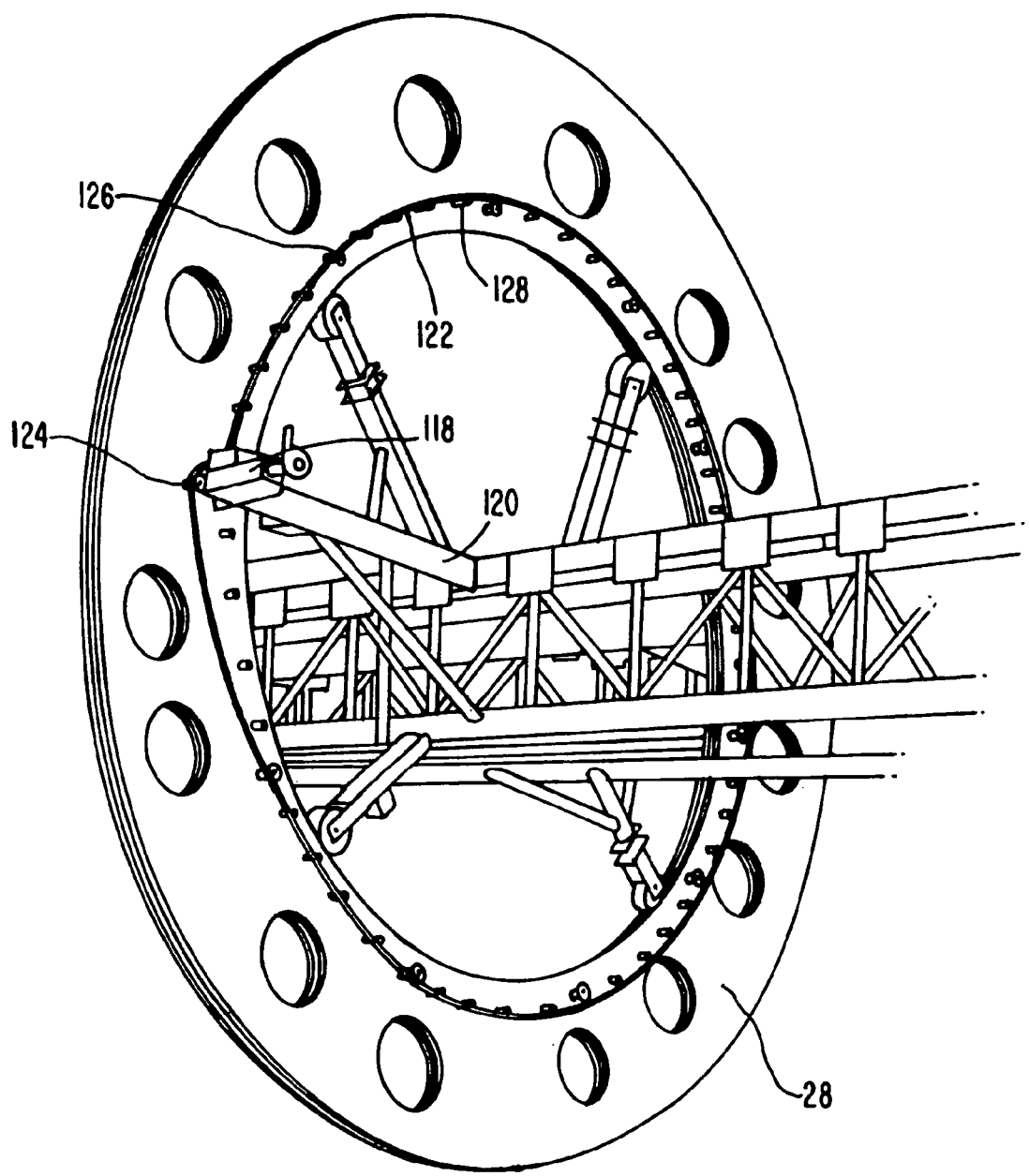
FIG. 7 is a perspective view of an actuation system to rotate annular disks on the rotating internal support for large hollow structures of FIG. 2.

Additionally, the inner support 10 can include an actuation system to rotate the annular disks 14. For example, a preferred embodiment shown in FIG. 7 can incorporate two electric drive motors 118 mounted on support arms 120 extending laterally from the central truss 12 at 180 degrees from one another. The drive motors 118 can each be coupled to the central disk 28, or drive disk, by a drive chain 122 of the roller chain type. That is, each of the drive motors 118 can be coupled to a drive sprocket 124 that can engage the drive chain 122, which in turn can engage a series of ten fixed sprockets 126 mounted at intervals around the face of the central disk 28 to drive or rotate the annular disk 28. In order to drive the additional annular disks, the torsion can be transferred to the first and third annular disks 26, 30 (see FIG. 2) by way of the cross beams 50, 52.

In this embodiment, the drive motors 118 are mounted at a radial distance beyond that of the fixed sprockets 126, such that the fixed sprockets 126 pass inside the drive sprockets 124 as the drive chain 122 passes over the drive sprockets 124. Four studs 128 between each of the fixed sprockets 126 maintain the drive chain length between each pair of fixed sprockets 126 so that the drive chain 122 is not excessively strained when passing over the drive sprockets 124.

Furthermore, in various embodiments, the drive motors 118 can be reversible, that is, the drive motors 118 can drive the annular disks 14 in a forward or reverse rotational, or angular, direction. In addition, the drive motors 118 can include an internal brake configured to impede or prevent rotation of the drive motors 118, and thus the annular disks 14. Nevertheless, alternative embodiments can include any suitable actuation system, including a single motor, more than two motors, two motors separated by less than 180 degrees, individual motors coupled to each of the annular disks, a belt drive, or an external braking system.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An internal support for a hollow, generally cylindrical structure that has at least one open end, comprising:
    a central truss having a longitudinal centerline;
    a plurality of annular disks aligned along a central axis that is parallel to the longitudinal centerline of the truss, each of the annular disks encircling the truss and including an inner circumference and an outer circumference; and
    a plurality of support arms fixedly attached to the truss, each one of the support arms extending between the annular disks and the truss.

2. The internal support of claim 1, wherein the truss includes a plurality of straight members that are relatively long with respect to their individual widths and are connected to each other at their ends to form a three-dimensional framework of triangles that is substantially resistant to bending about any axis that is perpendicular to the longitudinal centerline of the truss.

3. The internal support of claim 1, wherein each annular disk lies in a plane that is orthogonal to the longitudinal centerline of the truss.

4. The internal support of claim 1, wherein a diameter or a contour of the outer circumference differs between at least two of the annular disks so as to accommodate a structure of varying diameter or contour.

5. The internal support of claim 1, wherein each of the annular disks includes:
    a first disk that is relatively thin with respect to the overall thickness of the annular disk;
    a second disk that also is relatively thin with respect to the overall thickness of the annular disk, the second disk being fastened to the first disk such that the inner and outer circumferences of the first and second disks are axially aligned; and
    a plurality of spacers between the first disk and the second disk to axially separate the first disk and the second disk.

6. The internal support of claim 1, wherein at least one annular disk includes cutout areas to reduce the weight of the annular disk.

7. The internal support of claim 1, wherein the truss includes a plurality of support interfaces configured to engage a plurality of hanging support devices, whereby the internal support can securely hang from an overhead suspension device.

8. The internal support of claim 1, wherein the truss includes a platform surface on an upper side of the truss.

9. The internal support of claim 8, wherein the truss is configured to accommodate a handrail along a side of the platform surface.

10. An internal support for a hollow, generally cylindrical structure that has at least one open end, comprising:
    a truss having a longitudinal centerline;
    a plurality of annular disks aligned along a central axis that is parallel to the longitudinal centerline of the truss, each of the annular disks including an inner circumference and an outer circumference; and
    a plurality of support arms fixedly attached to the truss and coupled to the annular disks to attach the annular disks to the truss;
    wherein the annular disks are configured to rotate about the central axis.

11. The internal support of claim 10, further comprising a plurality of guide rollers configured to engage the inner circumferences of the annular disks, wherein at least one of the guide rollers is coupled to each of the support arms to retain the annular disks.

12. The internal support of claim 11, wherein each of the guide rollers includes a groove around a circumference of the guide roller, the groove being configured to engage the inner circumference of one of the annular disks.

13. The internal support of claim 10, wherein the inner circumference of each of the annular disks is circular and the outer circumference of at least one of the annular disks is noncircular, so as to conform to the inner contour of the structure.

14. An internal support for a hollow, generally cylindrical structure that has at least one open end, comprising:
    a truss having a longitudinal centerline;
    a plurality of annular disks aligned along a central axis that is parallel to the longitudinal centerline of the truss, each of the annular disks including an inner circumference and an outer circumference; and a plurality of support arms fixedly attached to the truss and coupled to the annular disks to attach the annular disks to the truss;

wherein at least one of the support arms is configured to extend or retract in order to compensate for a deflection of the truss.

15. An internal support for a hollow, generally cylindrical structure that has at least one open end, comprising:

a truss having a longitudinal centerline;

a plurality of annular disks aligned along a central axis that is parallel to the longitudinal centerline of the truss, each of the annular disks including an inner circumference and an outer circumference;

a plurality of support arms fixedly attached to the truss and coupled to the annular disks to attach the annular disks to the truss; and a drive motor that is coupled to the truss and linked to at least one of the annular disks, the drive motor being configured to rotate the at least one of the annular disks.

16. The internal support of claim 15, wherein the drive motor is further configured to rotate the at least one of the annular disks in both a forward angular direction and in a reverse angular direction.

17. An internal support for a hollow, generally cylindrical structure that has at least one open end, comprising:

a truss having a longitudinal centerline;

a plurality of annular disks aligned along a central axis that is parallel to the longitudinal centerline of the truss, each of the annular disks including an inner circumference and an outer circumference;

a plurality of support arms fixedly attached to the truss and coupled to the annular disks to attach the annular disks to the truss; and a plurality of retractable radial support rods attached at circumferential intervals around each of the annular disks and configured to radially extend beyond the outer circumference of the annular disks to contact an inner surface of the structure at a multiplicity of contact points in order to support the structure.

18. The internal support of claim 17, further comprising a plurality of contact pads attached at the distal ends of the support rods to contact and support the inner surface of the structure without damaging the structure.

19. The internal support of claim 17, further comprising a plurality of internally threaded fasteners affixed to the annular disks, wherein each of the support rods includes an externally threaded screw, and each of the threaded screws is threaded through one of the threaded fasteners such that the support rods can be rotatively actuated in order to extend or retract the support rods.

20. The internal support of claim 19, further comprising a socket tool configured to engage a head of the externally threaded screw in order to actuate the support rods, wherein the socket is further configured to engage the head from an off-center angle of approximately twenty degrees or less from the longitudinal centerline of the threaded screw.

21. The internal support of claim 17, wherein each of the support rods includes a telescoping mechanism to extend or retract the support rods.

22. An internal support for a hollow, generally cylindrical structure that has at least one open end, comprising:

a truss having a longitudinal centerline;

a plurality of annular disks aligned alone a central axis that is parallel to the longitudinal centerline of the truss, each of the annular disks including an inner circumference and an outer circumference; and a plurality of support arms fixedly attached to the truss and coupled to the annular disks to attach the annular disks to the truss;

wherein the truss includes a plurality of support interfaces configured to engage a plurality of fixed-height or adjustable jacks, whereby the internal support can securely rest on the plurality of jacks.

23. An internal support for a hollow, generally cylindrical structure that has at least one open end, comprising:

a truss having a longitudinal centerline;

a plurality of annular disks aligned along a central axis that is parallel to the longitudinal centerline of the truss, each of the annular disks including an inner circumference and an outer circumference; and a plurality of support arms fixedly attached to the truss and coupled to the annular disks to attach the annular disks to the truss;

wherein:

the truss includes a platform surface on an upper side of the truss;

the truss is configured with support interfaces to attach an extended lateral platform.

24. An internal support for a hollow, generally cylindrical structure that has at least one open end, comprising:

a truss having a longitudinal centerline;

a plurality of annular disks aligned along a central axis that is parallel to the longitudinal centerline of the truss, each of the annular disks including an inner circumference and an outer circumference; and a plurality of support arms fixedly attached to the truss and coupled to the annular disks to attach the annular disks to the truss;

wherein:

the truss includes a platform surface on an upper side of the truss;

the truss is configured with an extended lateral platform.

25. An internal support for a hollow, generally cylindrical structure that has at least one open end, comprising:

a truss having a longitudinal centerline;

a plurality of annular disks aligned along a central axis that is parallel to the longitudinal centerline of the truss, each of the annular disks including an inner circumference and an outer circumference; and a plurality of support arms fixedly attached to the truss and coupled to the annular disks to attach the annular disks to the truss;

wherein the truss includes at least one longitudinal rail to support a hanging cart.

26. The internal support of claim 25, further comprising a hanging cart moveably attached to the rail such that the hanging cart is free to translate along the longitudinal centerline of the truss.

27. An internal support for a hollow, generally cylindrical structure that has at least one open end, comprising:

retractable means for circumferentially supporting an internal surface of the structure at a multiplicity of contact points around a circumference of the structure;

rotatable means for retaining the retractable means for supporting;

central means for rigidly supporting the rotatable means for retaining; and vertically adjustable means for attaching the rotatable means for retaining to the central means for rigidly supporting, the vertically adjustable means being adapted to move the rotatable means relative to the central means.

28. A method for internally supporting a hollow, generally cylindrical structure that has at least one open end, comprising the steps of:
- rotatably attaching a plurality of annular disks at a plurality of axial locations along a central axis that is parallel to a longitudinal centerline of a substantially rigid central truss;
- adjusting a vertical distance from the central truss to at least one of the annular disks;
- retaining a plurality of radial support rods at circumferential intervals around each of the annular disks; and
- extending the support rods to contact an inner surface of the structure at a multiplicity of contact points in order to support the structure.

* * * * *

UNITED STATES PATENT AND TRADEMARK OFFICE
CERTIFICATE OF CORRECTION

PATENT NO. : 7,596,843 B2  Page 1 of 1
APPLICATION NO. : 11/153482
DATED : October 6, 2009
INVENTOR(S) : Spishak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

Twenty-eighth Day of September, 2010

David J. Kappos
*Director of the United States Patent and Trademark Office*